United States Patent Office 3,169,650
Patented Feb. 16, 1965

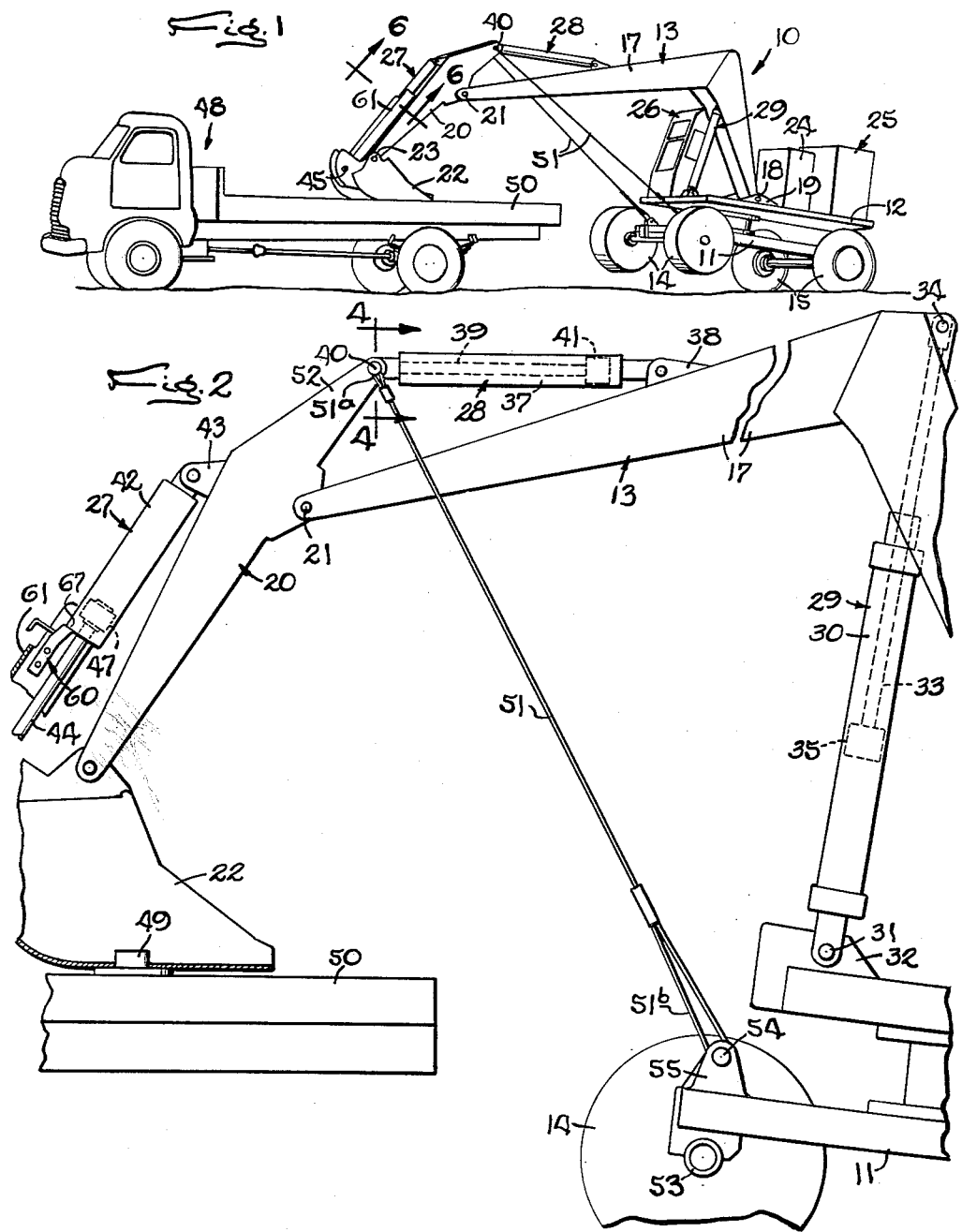

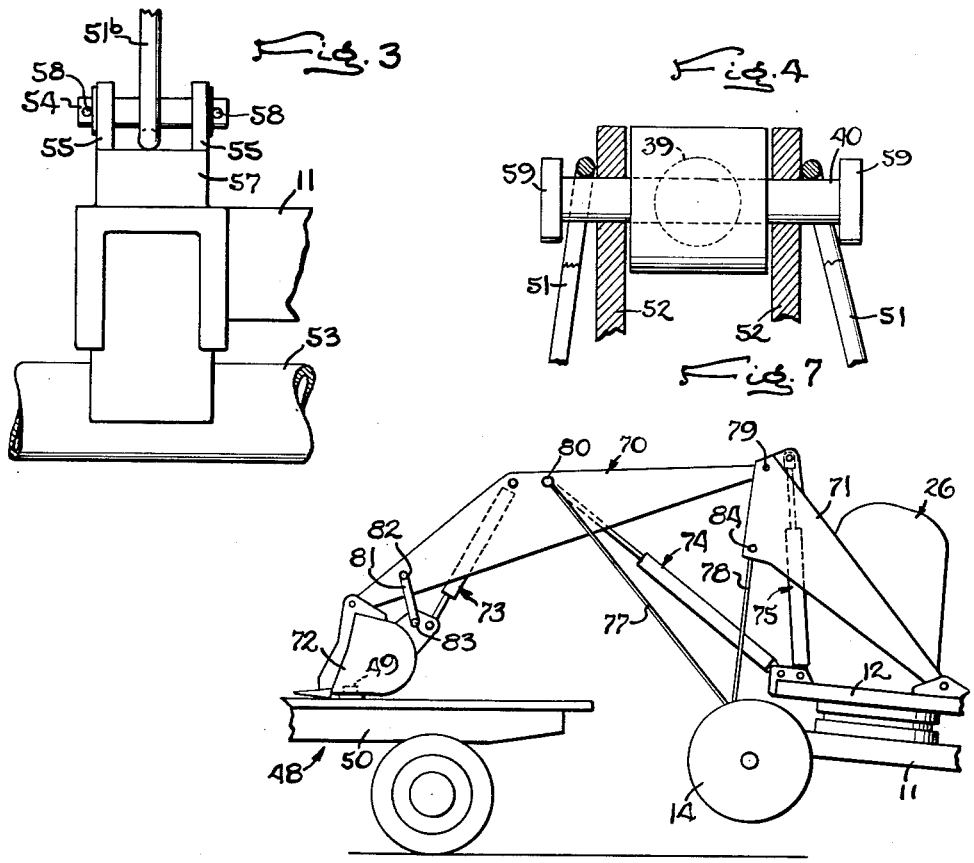

3,169,650
TRANSPORT ARRANGEMENT FOR MOBILE EXCAVATOR
Ingebret Soyland, City of Bryne, near Stavanger, Norway
Filed Dec. 23, 1963, Ser. No. 332,732
9 Claims. (Cl. 214—138)

This invention relates generally to mobile excavators of the type disclosed in Patent No. Re. 25,495 including a wheel-supported frame and a boom formed by two pivotally connected arms with one of the arms pivoted on a rotary platform on the frame and the other pivotally supporting a digging shovel. Hydraulically powered actuators are provided for moving the platform, each arm, and the shovel independently of the other elements during the excavating operation, and the excavator is moved from place to place on the work site by means of the boom by which the frame is pushed, pulled or tilted upwardly at one end and pivoted sideways over the ground. Preparatory to movement of the excavator to or from a work site, the shovel is placed on and secured to a tow vehicle and the hydraulic actuators are used to lower the boom and thus elevate the front end of the frame to a transport position in which the excavator freely trails the vehicle.

The primary object of the present invention is to lock the boom and the frame in the transport position in an extremely simple manner with the front end of the frame held off the ground independently of the hydraulic actuators thereby eliminating the necessity of maintaining hydraulic pressure in the system during towing and eliminating danger of the release or lowering of the excavator as a result of accidental loss of pressure.

A more specific object is to make the boom rigid against bending intermediate its ends in a novel and simple manner which also suspends the elevated front end of the frame from the boom.

Other objects and advantages of the present invention will become apparent from the following detailed description taken into conjunction with the accompanying drawings in which:

FIGURE 1 is a perspective view showing a truck towing an excavator embodying the novel features of the present invention.

FIG. 2 is an enlarged fragmentary side elevation similar to a portion of FIG. 1 with parts broken away and shown in section.

FIG. 3 is an enlarged fragmentary front end view of a portion of FIG. 2.

FIG. 4 is an enlarged fragmentary cross-sectional view taken along the line 4—4 of FIG. 2.

FIG. 5 is an enlarged perspective view of the safety block shown in FIG. 2.

FIG. 6 is an enlarged cross-sectional view taken along the line 6—6 of FIG. 1.

FIG. 7 is a fragmentary side elevational view similar to a portion of FIG. 1 and showing a modified form of the invention.

As shown in the drawings for purposes of illustration, the invention is embodied in a mobile excavator 10 of the type shown in the aforesaid patent having a chassis frame 11 including a normally horizontal platform 12 rotatably supported on the frame with an articulated, power-operated shovel boom 13 pivoted on the platform, and freely rotatable front and rear wheels 14 and 15 journaled on the frame to support the excavator during operation and during movement of the excavator from site to site. The boom comprises a jib arm 17 with one end disposed between and pivoted at 18 on two upstanding brackets 19 on the top of the platform and with a shovel arm 20 pivoted on a horizontal pin 21 on the free end of the jib arm and pivotally supporting the shovel 22 at its free end. The shovel swings on the shovel arm about a horizontal axis defined by a pin 23.

Excavators of this type are usually powered by hydraulic fluid from a tank 24 supplied under pressure to the various power actuators for the platform 12, the two arms 17 and 20, and the shovel 22 by an engine and a pump mounted on the platform 12 and indicated at 25, the actuators being controlled in the usual manner from an operator's cab 26 on the platform. The latter is rotated by a suitable hydraulic motor (not shown), and the shovel and the two arms are operated by three reciprocating hydraulic motors 27, 28 and 29.

In the embodiment shown in FIGS. 1 through 6, the boom 13 is constructed to form a so-called back hoe in which the jib arm 17 is formed in two sections disposed at an angle with each other on the order of 90 degrees and the shovel arm 20 is pivoted intermediate its ends on the free end of the jib arm with the shovel opening rearwardly toward the frame. The cylinder 30 (FIG. 2) of the jib actuator 29 is pivoted at 31 on a bracket 32 centered on the forward end of the platform 12 and extends upwardly toward the jib arm with the upper end of the piston rod 33 pivoted on a pin 34 adjacent the joint between the two jib sections. Thus, back and forth movement of the piston 35 raises and lowers the free end portion of the jib relative to the platform 12 and the frame 11.

To swing the shovel arm 20 relative to the jib arm 17, the cylinder 37 of the actuator 28 is pivoted on a bracket 38 mounted on the upper side of the jib, and the piston rod 39 is pivoted on the upper end of the shovel arm 20 by means of a pin 40 spaced above the axis about which the shovel arm swings. With this arrangement, sliding of the piston 41 to the left in FIG. 2 extends the piston rod and swings the shovel arm counterclockwise to move the shovel inwardly or rearwardly toward the frame. As the piston slides toward the right, the shovel swings outwardly.

Similarly, the cylinder 42 of the shovel actuator 27 is pivoted on a bracket 43 on the shovel arm and the piston rod 44 is pivoted on a horizontal pin 45 (FIG. 1) fast on the forward portion of the shovel. Thus, movement of the piston 47 downwardly toward the left in FIG. 2 extends the rod to turn the shovel counterclockwise in the normal digging motion for such excavators. Reverse movement of the piston and rod turns the shovel clockwise in the motion employed in emptying a load or preparing for a digging stroke.

Excavators of this type, having no power on the wheels 14, 15, are moved from place to place on the work site by using the bottom 13, in the manner described in the aforesaid patent, to push, pull or tilt and pivot the frame 11 along the ground. Thus, the excavator maintains its mobility even when working in mud and the like where the wheels sink deeply into the ground and where ordinary power-driven excavators would be helpless. The excavator is transported to and from the work site by means of a tow vehicle such as a truck 48 (FIGS. 1 and 2) which is provided with a tow pin 49 secured to the bed 50 of the truck and positioned to fit upwardly into a hole in the shovel 22 in the manner shown in FIG. 2. Preparatory to transporting the excavator, the shovel is placed on the truck bed and over the tow pin, and the boom then is lowered relative to the frame to press the shovel downwardly against the bed and lift the front end of the frame and the front wheels 14 to a transport position well above the ground. In this condition, the excavator is supported solely by the tow truck and the rear wheels 15 and thus is in a position to trail the tow truck freely along the road.

When the various parts of the excavator 10 are in their respective transport positions, the actuators 27 and 29 are at least partially extended and thus will hold the front end of the excavator in the elevated position only so long as the cylinders 30 and 42 remain pressurized. If, for any reason, the pressure in the hydraulic system of the excavator should be relieved, serious damage to the excavator could occur, particularly if it were released while the excavator was being towed along the road at a relatively high speed.

The present invention contemplates the provision of novel and simple means for locking the boom 13 and the frame 11 in the transport positions during towing independently of the hydraulic system and thereby eliminating the danger of loss of the excavator 10 as a result of release of the pressure in the hydraulic system. To this end, the shovel 22 is locked against pivoting on the shovel arm 20, the jib arm 17 and the shovel arm are secured together to prevent any pivoting at the joint 21, and the elevated front end of the frame is secured to the boom and thus suspended from the boom and held well above the ground.

In the form shown in FIGS. 1 through 6 in which the shovel arm 20 is pivoted intermediate its end on the jib arm 17, a non-extensible safety member, herein a steel cable 51, is fastened at its opposite ends to the upper end portion 52 of the shovel arm and to the frame 11 adjacent the front axle 53 and is made taut to tie the upper end of the shovel arm to the frame. Connected in this manner, the cable serves not only to support the front of the frame on the boom 13 but also to prevent forward rotation of the shovel arm, i.e., counterclockwise rotation as viewed in FIG. 2. Preferably, two identical cables 51 are fastened to the frame adjacent the opposite ends of the axle and to opposite sides of the upper end of the shovel arm. To facilitate attachment and removal of these cables, each is formed with two loops 51a and 51b at its opposite end and pins are provided for securing the loops to the respective points on the excavator. The lower pin 54 (see FIGS. 2 and 3) for each cable is mounted on the front end of the frame above the adjacent end portion of the axle on two plates 55 welded to a block 57 (FIG. 3) fast on the front corner of the frame, the plates being spaced apart laterally of the frame and formed with two aligned holes through which the pin is telescoped. Cotter keys 58 or the like inserted through the pin outside the plates 55 hold the pin in place in the plates. The upper pins for the safety cables are formed by the projecting end portions of the pivot pin 40 forming the joint between the upper end portion 52 of the shovel arm and the rod 39 of the actuator 28. Two blocks 59 (FIG. 4) are welded to the ends of the pin 40 and project upwardly therefrom to prevent the upper cable loops 51a from sliding off the pin. Thus, the pins 40 and 54 and the loops 51a and 51b form readily releasable connections permitting the safety cables 51 to be fitted quickly into place to make the excavator ready for towing.

With the front end of the frame 11 suspended from the upper end of the shovel arm 20, the weight acting on the cables 51 tends to swing the shovel arm downwardly about the tow pin 49 and counterclockwise relative to the jib arm 17. It will be seen in FIG. 2, however, that the actuator 28 for the shovel arm is fully contracted in the transport position with the piston 41 abutting against the head end of the cylinder 37. Thus, the adjacent end surfaces of the piston and the cylinder constitute abutment surfaces on the shovel arm and the jib arm respectively which prevent clockwise swinging of the shovel arm from the transport position. Since the weight of the frame, acting through the cables, resists counterclockwise swinging, the boom 13 is held rigidly in the transport position on the truck bed 50.

If the hydraulic pressure in the system should be relieved for any reason during towing, a jolt on the truck 48 or the excavator 10 could cause the shovel 22 to turn clockwise and swing upwardly clear of the tow pin 49. To safeguard against this possibility, a locking member 60 is provided to prevent contraction of the actuator 27 which is at least partially extended in the transport position and in this instance is fully extended as will be seen in FIGS. 1 and 2. This locking member is a block (see FIG. 5) which is fitted inside a shield 61 of generally U-shaped cross-section mounted on the shovel 22 to cover the piston rod 44 and telescope with the cylinder 42 as the rod is extended and contracted. The block fits snugly between the sidewall 62 (FIG. 6) of the shield and is suitably secured thereto, for example by two pins 63 inserted through aligned holes 64 in the side walls and also through bores 65 through the block with the opposite end portions of the pins projecting outwardly through and beyond the shield sidewalls. Cotter keys 69 are inserted through holes in the projecting end portions of the pins. The upper end surface 67 of the block abuts against the rod end of the cylinder 42 and thus prevents contraction of the actuator 27 and clockwise turning of the shovel 22. A bar 68 is fastened to the upper side of the block to project upwardly and outwardly past the upper end of the shield 61 and provide a readily accessible handle facilitating handling of the block during installation and removal.

When the various parts of the excavator 10 have been placed in their transport positions with the shovel actuator 27 extended, the shovel arm actuator 28 contracted, the jib arm actuator 29 partially extended, and the front wheels 14 spaced well above the ground, the block 60 is slipped into the shield 61 and pinned thereto and the safety cables 51 are slipped over the ends of the pivot pin 40 and over the pins 54 between the plates 55. Either the lengths of the cables are made adjustable or the front end of the excavator first is raised somewhat above the transport position to permit the cables to be slipped into place. When the various pins and cotter keys have been inserted in place, the excavator is ready for transporting. Regardless of the pressure in the hydraulic cylinders, the boom 13 is held rigid by the abutting surfaces on the piston 41 and the cylinder 37 and the cooperating safety cables which also suspend the front end of the frame 11 in the transport position. It will be evident that the cables also prevent rotation of the platform 12 and the side to side swinging of the boom relative to the frame. It has been found that approximately one-quarter of the weight of the excavator is supported on the truck bed 50 so it will be seen that there is little danger that the shovel 22 will be jolted free of the tow pin 49. In some instances, however, it may be desirable to thread a nut (not shown) on the pin inside the shovel as a safeguard against such jolting.

Shown in FIG. 7 is a modified form of the excavator in which the shovel arm 70 is pivoted at 79 on the free end of a straight jib arm 71 and the shovel 72 is mounted to open forwardly rather than rearwardly as it is on the back hoe. In this case, the shovel actuator 73 acts between the shovel arm and the rear end of the shovel and the shovel arm actuator 74 acts between the forward end of the platform 12 and a point intermediate the ends of the shovel arm. The jib arm is similar to, and may, in fact, be the lower end section of the angular jib arm 17 shown in FIGS. 1 and 2. The jib arm actuator 75 is the same as the actuator 29 shown in FIGS. 1 and 2.

To secure this excavator in a transport position, two safety cables 77 are fastened, as before, to the front end of the frame 11 and to the shovel arm 70 intermediate its ends, and two additional cables 78 are fastened to the front end of the platform and to the free end portion of the jib arm 71. These two sets of cables suspend the front end of the frame from the boom and also prevent relative pivoting of the two arms 70, 71 at the central joint 79. The cables 78 and prevent clockwise rotation of the jib arm 71 relative to the frame and the platform (that is, rotation that would lower the front end of the frame or elevate the free end of the jib) and the cables 77 prevent clockwise rotation of the shovel arm relative to the jib arm. The lower ends of both sets of cables may be fastened to the pin 54 in the manner shown for the cable 51 in FIG. 3, and the upper ends of the cables are secured to pins 79 and 84 fast on the respective arms. Loops (not shown), or some other releasable connections are provided at opposite ends of both sets of cables.

To secure the shovel 72 in its transport position, the upper ends of a pair of tie-bars 81 disposed on opposite sides of the free end of the shovel arm 70 are bolted at 82 to the shovel arm, and the lower ends of these bars are disposed on opposite sides of the rear portion of the shovel and are bolted at 83 to the shovel. In this manner, the shovel is secured rigidly to the shovel arm independently of its actuator 73.

From the foregoing, it will be seen that the safety cables 51, 77, 78 suspend the front end of the frame 11 on the boom and lock the latter in the transport position in an extremely simple manner. The cables 51 in the first embodiment cooperate with the contracted actuator 28 to insure that the boom 13 is held rigidly in the transport position and that the frame 11 is held with its front end elevated, and the block 60 prevents pivoting of the shovel 22 relative to the shovel arm 20 and the tow pin 49. In the alternate form FIG. 7 where the usual shovel arm actuator is not conveniently located to prevent pivoting of the boom at the joint 79, the two sets of cables 77, 78 perform the same function as the one set 51 in cooperation with the contracted actuator 28. The means for holding the shovel 72 takes the form of the tie-bars 81 rather than the block 60. In both instances, the boom and the front end of the frame are held securely in the transport position independently of the pressure in the hydraulic system so that there is no danger of lowering or release of the excavator during towing.

I claim as my invention:

1. In a mobile excavator, the combination of, a frame having front and rear ends; ground-engaging wheels on said frame adjacent each end; said frame including a normally horizontal platform supported for rotation about a vertical axis; an articulated boom pivoted on top of said platform for swinging about a horizontal axis and including a jib arm pivoted at one end on the platform, a shovel arm pivoted intermediate its ends on the free end of said jib arm, and a shovel pivoted on one end of said shovel arm; a reciprocating hydraulic actuator for said shovel arm mounted above said jib arm and having opposite ends connected to the jib arm and to the other end portion of said shovel arm; a reciprocating hydraulic actuator for said jib arm having opposite ends connected to said platform and said jib arm; a reciprocating hydraulic actuator for said shovel having opposite ends connected to said shovel arm and said shovel; a hydraulic actuator for rotating said platform; means for delivering fluid under pressure selectively to said actuators to operate the later and swing said boom to a transport position in which said arms extend forwardly from said frame in a predetermined angular relation, place said shovel on a tow vehicle, and lower the boom to elevate the front wheels off the ground, said shovel arm actuator being fully contracted in said predetermined relation of said arms thereby to prevent relative swinging of said arms in a direction to lower said front wheels; a pair of safety cables disposed on opposite sides of said boom and extending between said other end position and the front end of said frame; and a connection at each end of each cable for securing the latter to said frame and to said other end portion thereby to hold said arms in said predetermined relation, suspend said front end from said boom, and prevent rotation of said platform independently of said hydraulic actuators.

2. The combination defined in claim 1 further including a safety block removably mountable on said boom in position to block contraction of said shovel actuator when the latter is fully extended and thereby lock said shovel in a predetermined angular position relative to said shovel arm.

3. In a mobile excavator, the combination of, a normally horizontal frame having front and rear ends, a ground-engaging wheel on said frame adjacent said rear end, a jib arm pivoted on the upper side of said frame for swinging about a first horizontal axis and being movable into a transport position extending upwardly and forwardly from said axis, a shovel arm pivoted on the free end portion of said jib arm for swinging about a second horizontal axis, a shovel pivoted on the free end of said shovel arm for swinging about a third horizontal axis, said shovel arm being movable into a forwardly extending transport position in which said shovel is disposed in advance of said frame, selectively operable power actuators for swinging said arms and said shovel independently of each other about the respective axes to place the shovel on a tow vehicle and swing said arms into predetermined angular positions relative to said frame in which said front end is elevated to a transport position above the ground, and safety means for locking said arms in said predetermined angular positions relative to said frame independently of said power actuators whereby said arms and said front end are held in said transport positions when said power actuators are de-energized, said safety means including at least one non-extensible member extending downwardly and rearwardly from said shovel arm to the front end of said frame, and a connection at each end of said member for fastening the ends of the latter to the frame and the shovel arm when said front end is in said transport position thereby to suspend said front end from said shovel arm.

4. The combination defined in claim 3 further including opposed surfaces on said arms abutting against each other when said arms are in said transport positions and preventing relative swinging of the arms in a direction to lower said front end.

5. The combination defined in claim 3 in which said shovel arm is pivoted intermediate its ends on said jib arm and the upper end of said member is fastened to the shovel arm adjacent the end thereof opposite said shovel.

6. The combination defined in claim 5 further including a reciprocating power actuator disposed above the free end portion of said jib arm and having opposite ends fastened to the jib arm and to the end portion of the shovel arm to which the upper end of said member is fastened, said reciprocating actuator being contracted when said arms are in the transport position, and opposed surfaces on said reciprocating actuator abutting against each other when said arms are in said transport positions to prevent further contraction of the reciprocating actuator thereby to cooperate with said member in holding said arms in said transport positions.

7. The combination defined in claim 3 further including locking means acting between said shovel arm and said shovel to lock the latter in its transport position independently of its actuator.

8. In a mobile excavator, the combination of, a normaly horizontal frame having front and rear ends, a ground-engaging wheel on said frame adjacent said rear end, a jib arm pivoted on the upper side of said frame for swinging about a first horizontal axis and being movable into a transport position extending upwardly and forwardly from said axis, a shovel arm pivoted on the free end of said jib arm for swinging about a second horizontal axis, a shovel mounted on the free end of said shovel arm, said shovel arm being movable into a forwardly extending transport position in which said shovel is disposed in advance of said frame, selectively operable power actuators for swinging said arms and said shovel independently of each other about the respective axes to place the shovel on a tow vehicle and swing said arms into predetermined angular positions relative to each other and to said frame in which said front end is elevated to a transport position above the ground, a first safety cable extending downwardly from the free end portion of said shovel arm to said front end, a second safety cable extending downwardly from the free portion of said jib arm to said front end, and a connection at each end of each cable for fastening the cable ends to the frame and to the respective arms and locking said arms in said predetermined angular positions independently of said power actuators.

9. The combination defined in claim 8 further including at least one tie-bar releasably secured at its opposite ends to said shovel and said shovel arm thereby to lock the shovel in a predetermined angular position relative to the shovel arm.

References Cited in the file of this patent
UNITED STATES PATENTS
Re. 25,495   Soyland _____ Dec. 17, 1963